UNITED STATES PATENT OFFICE.

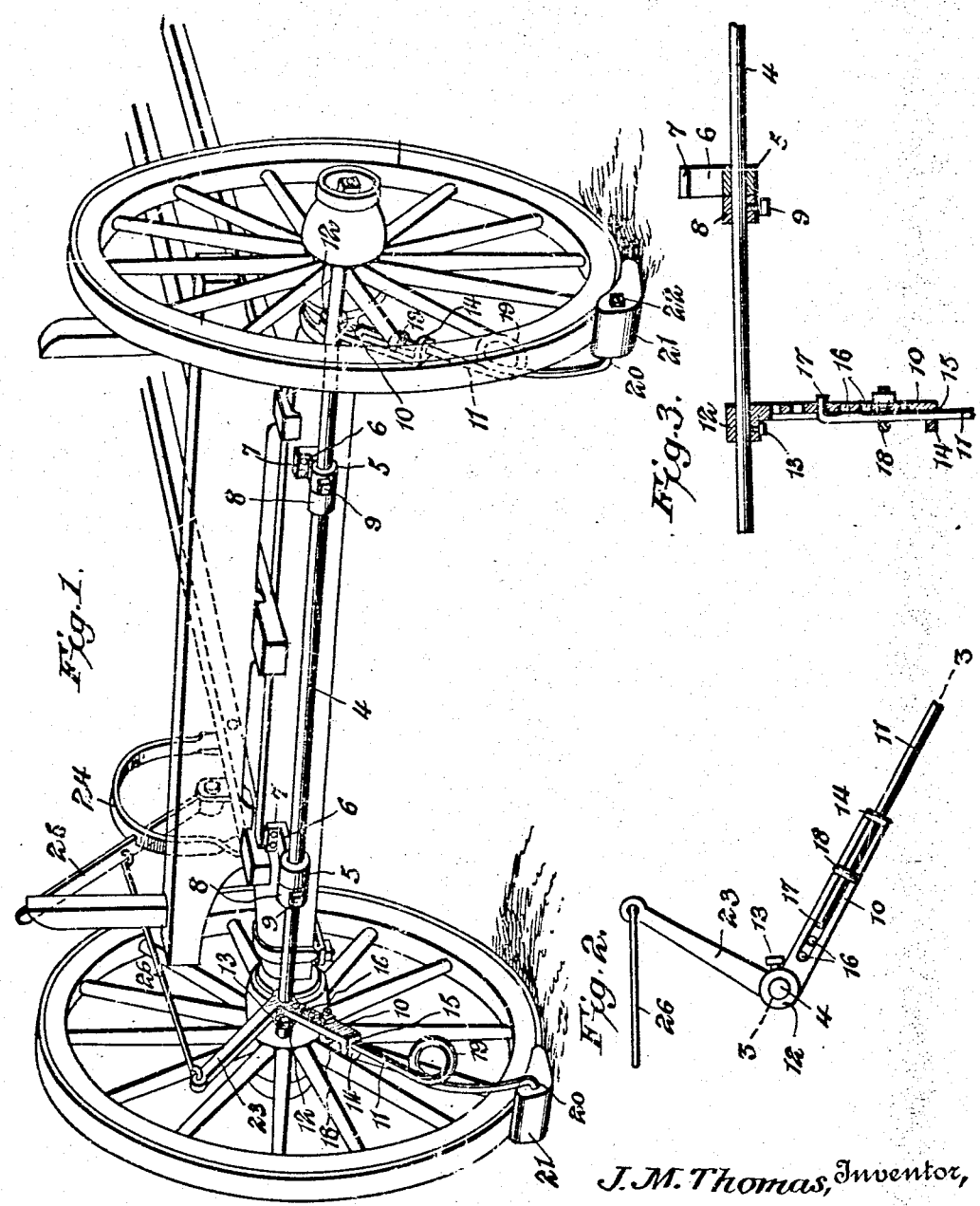

JAMES MADISON THOMAS, OF TALLADEGA, ALABAMA.

CHOCK.

No. 849,937.     Specification of Letters Patent.     Patented April 9, 1907.

Application filed August 28, 1906. Serial No. 332,355.

*To all whom it may concern:*

Be it known that I, JAMES MADISON THOMAS, a citizen of the United States, residing at Talladega, in the county of Talladega and State of Alabama, have invented a new and useful Chock, of which the following is a specification.

This invention relates to means for chocking the wheels of vehicles to prevent retrograde movements of said vehicles and relieve the draft-animals of strain when at a standstill on hills or grades.

The principal object is to provide simple mechanism of a novel nature that can be conveniently applied to a wagon, is adjustable to properly coöperate with wheels of different diameters, and will constitute an effective chock which can be readily moved to an operative or to an inoperative position.

The preferred form of construction is illustrated in the accompanying drawings, wherein—

Figure 1 is a perspective view of a rear portion of a vehicle, showing the chock applied thereto. Fig. 2 is a side view of a portion of one of the arms. Fig. 3 is a sectional view on the line 3 3 of Fig. 2.

Similar numerals of reference designate corresponding parts in all the figures of the drawings.

In the embodiment illustrated a rock-shaft 4 is employed, which is arranged to be journaled upon the rear portion of a vehicle. To this end spaced boxings 5 are arranged upon the shaft and are provided with ears 6, having offset terminals 7, adapted to be fastened to the vehicle. In order to prevent longitudinal movement of the rock-shaft 4 in the boxings, collars 8 are preferably employed, which collars are secured to the shaft by set-screws 9.

Arms are mounted on the ends of the rock-shafts and constitute supports for the chocking devices. These arms consist of slidably-associated sections 10 and 11, the sections 10 having hubs 12 secured to the shaft by set-screws 13. The sections 10, furthermore, have offset terminals 14, through which are formed openings 15, and other openings 16 are also provided in the arms between the offset terminals and the hubs. The sections 11 are preferably in the form of rods that pass through the openings 15 in the offset terminals 14, these rods having offset terminals 17, that engage in the openings 16. Eye-bolts 18, surrounding the rods, are also adjustable in the openings 16 and serve to hold the sections 10 and 11 against detachment, as will be evident by reference to Fig. 3. The sections 11, furthermore, are provided between their ends with coils 19, and their outer ends are offset, as shown at 20, to provide journal-pins on which are rotatably mounted chock-blocks 21, held in place by nuts 22. The section 10 of one of the arms constitutes one arm of a bell-crank lever, the other arm of said lever being designated 23 and constituting a part of the actuating means for the chock. Thus in the present embodiment a quadrant-rack 24 is secured to the vehicle, and a lever 25, coöperating with this rack, has a link connection 26 with the arm 23. It will be understood that any suitable actuating mechanism may be substituted for this lever and the parts associated therewith.

In applying the chock to a vehicle the journal-boxes 5 are secured to the rear axle or the part of the vehicle running-gear that is conveniently located with relation to the rear wheels. The sections 10 and 11 of the arms are then adjusted so that the chock-blocks 21 will properly engage the roadway just in rear of the wheels. It will therefore be evident that if the lever 25 is moved forwardly the blocks 21 will be elevated and the chock will be in inoperative position. If, however, the lever 25 is swung rearwardly, the chock-blocks will be moved to operative positions in rear of and beneath the wheels. The yielding construction of the arms formed by the coils 19 insures the proper coaction of said chock-blocks with the wheels and roadway.

It will be clear that the construction is very simple, is readily applicable to any well-known make of vehicle, and experience has demonstrated that it will constitute an effective chock to prevent retrograde movement of the wagon.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what

I claim as new, and desire to secure by Letters Patent, is—

1. The combination with a swinging arm comprising relatively movable sections, of means for normally holding the sections against movement, one of said sections being laterally yieldable, means connected to the other section for swinging the arm, and a chock carried by the yieldable section.

2. The combination with a swinging arm comprising slidably-associated sections, and means for holding the sections against sliding movement, of means connected to the inner section for pivotally mounting and swinging the arm, the other section being laterally yieldable, and a chock carried by the outer end of the yieldable section.

3. The combination with a pivotally-mounted arm-section having an offset terminal, of another arm-section slidably mounted in the offset terminal and having an offset terminal that adjustably interlocks with the first-mentioned arm-section, means for maintaining said interlocking engagement and holding said sections against sliding movement, a chock carried by the outer end of the slidable section, and means for swinging the sections.

4. The combination with a rock-shaft, of means for mounting the same on a vehicle, means for operating the rock-shaft, laterally-yieldable arm-sections adjustably mounted on the rock-shaft and having intermediate coiled spring portions, and chock-blocks mounted on the outer ends of the adjustable yielding-arm sections.

5. The combination with a rock-shaft, of journal-boxes for said shaft, means for securing the journal-boxes to a vehicle, arms carried by the rock-shaft and comprising slidably-associated sections, means for holding the sections against their sliding movements, one of the sections of each arm having a coiled portion and an offset terminal, chock-blocks mounted on said offset terminals, one of the arms having a section that consists of a bell-crank lever, and actuating means for the chock connected to said bell-crank lever.

In testimony that I claim the foregoing as my own I have hereto affixed my signature in the presence of two witnesses.

JAMES MADISON THOMAS.

Witnesses:
J. A. THORNTON,
W. C. DOWDELL.